United States Patent Office 3,153,693
Patented Oct. 20, 1964

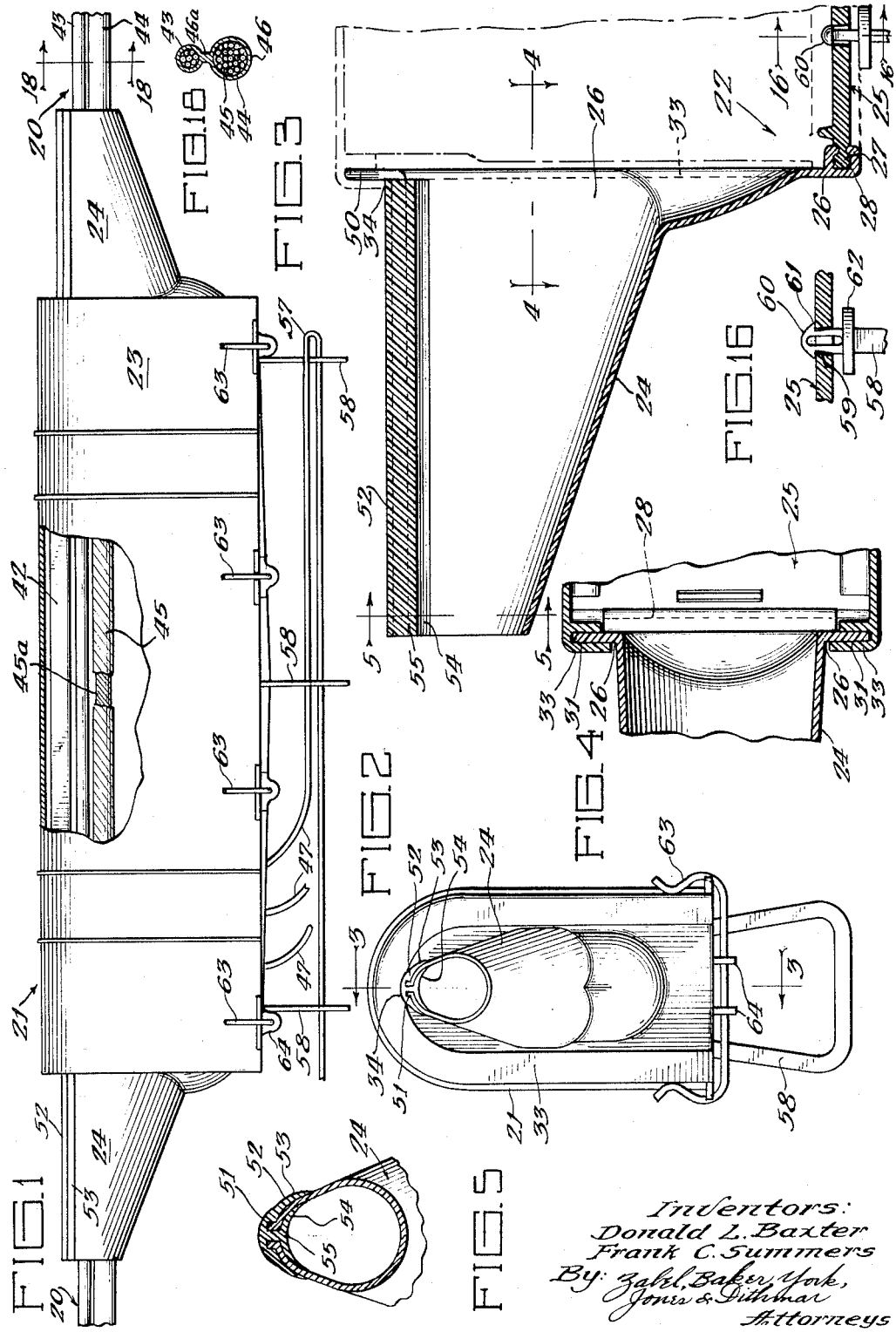

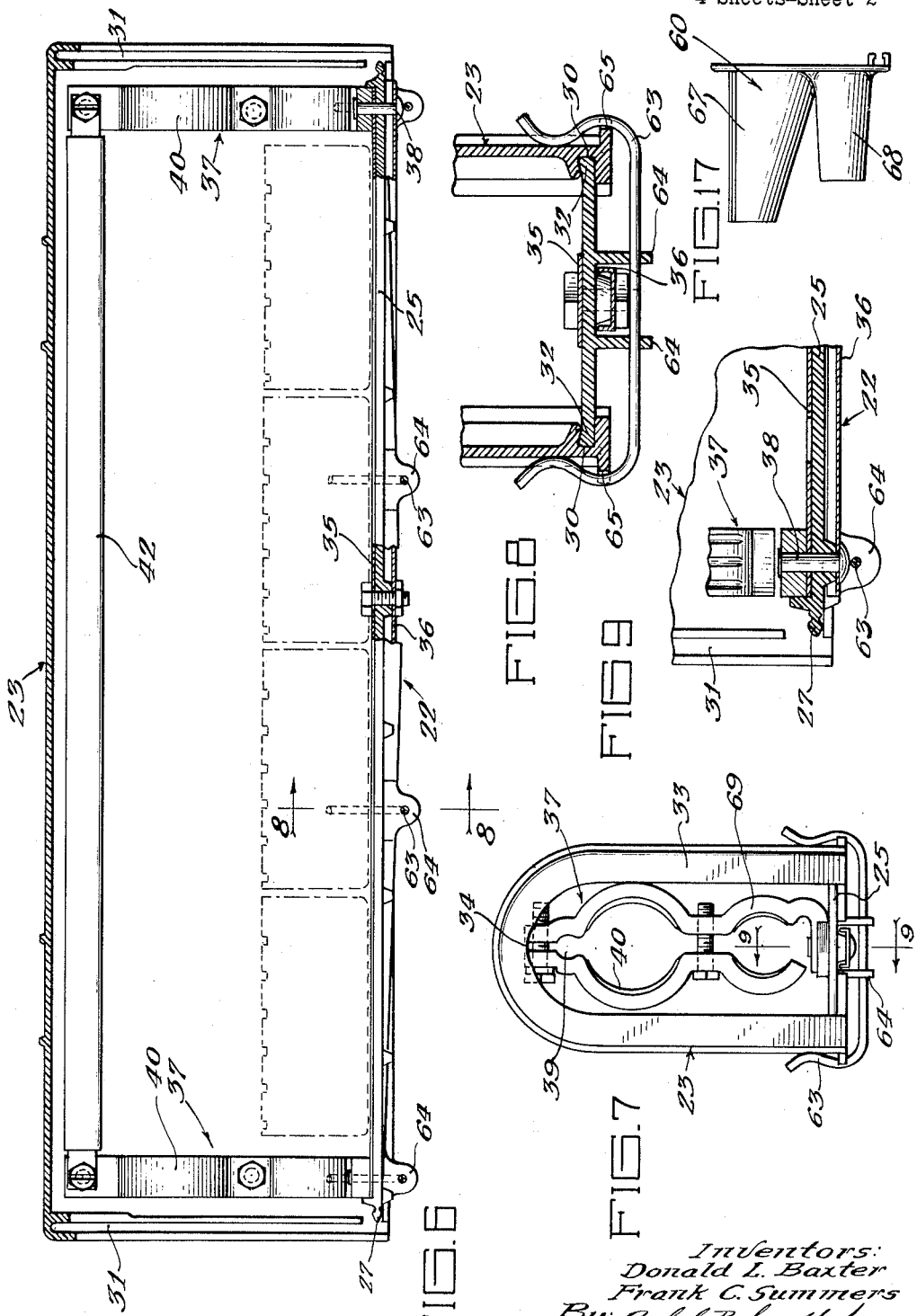

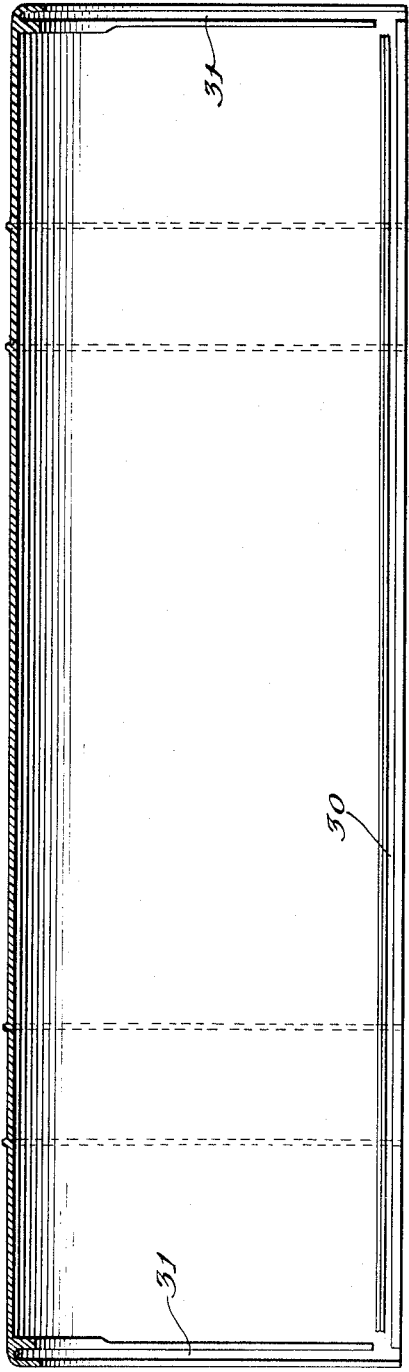
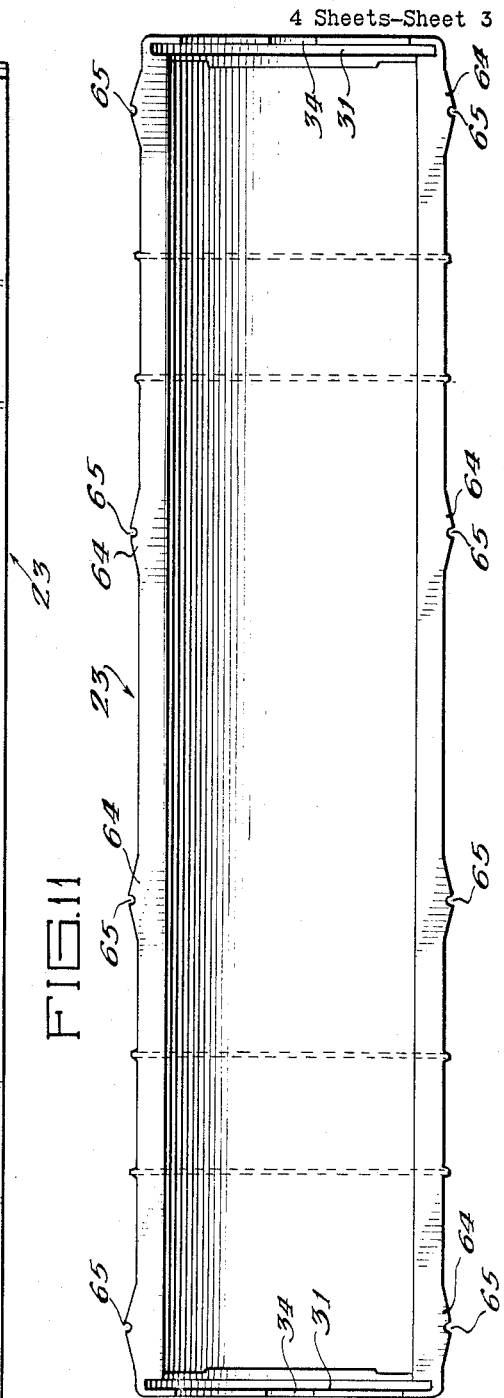

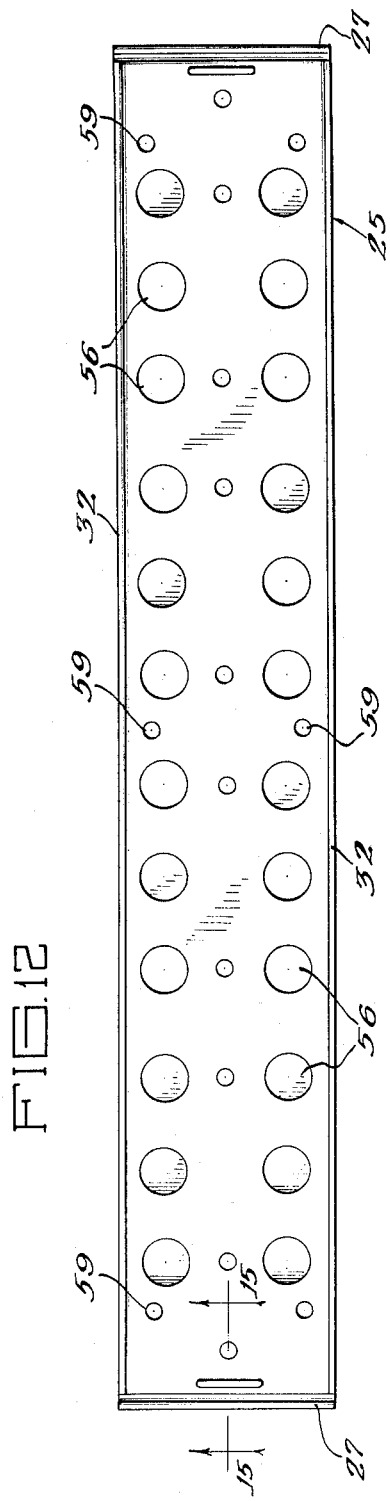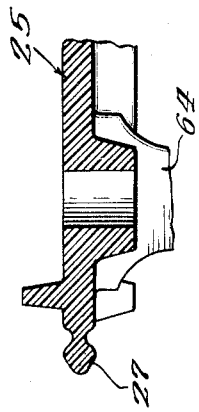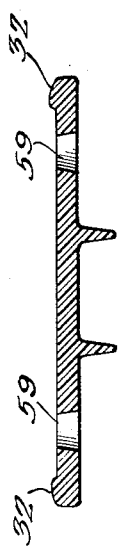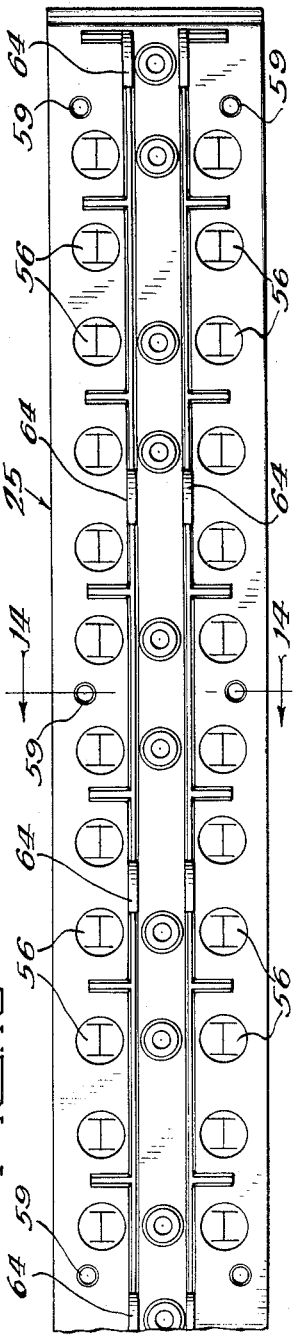

3,153,693
READY ACCESS CABLE HOUSING
Donald L. Baxter, Elmhurst, and Frank C. Summers, Chicago, Ill., assignors to Reliable Electric Company, Franklin Park, Ill., a corporation of Illinois
Filed Oct. 1, 1962, Ser. No. 227,138
11 Claims. (Cl. 174—40)

The present invention relates to a ready access type of housing for use with messenger cable.

The term "messenger cable" as used herein refers to the combination of two elements: the messenger or supporting strand plus the cable which is supported thereby. The messenger and the cable are connected to each other by rings, by a helical or lashing wire, or by a common sheath.

The present invention is characterized in that the cable housing encloses the messenger strand as well as the cable, and is provided with improved entry means which receives the messenger cable as a whole.

Before proceeding with an outline of the various features and advantages of this invention, it should be pointed out that the term "ready access" has a special meaning in the trade, in that it refers to equipment designed for use with a special type of cable.

A cable housing is used to protect communication cable or the like at the point where the cable sheath has been stripped. Cable sheath is stripped to provide access to conductor pairs for purposes of splicing, termination, or insertion of loading coils.

"Ready access" is a term used in the trade with respect to terminals, splice cases, and analogous equipment designed for use with a plastic sheath cable having plastic insulated conductors, such equipment being characterized by the fact that the housing is made of a flexible material, such as neoprene.

The cable construction permits the use of an unsealed housing, but nevertheless the housing should be reasonably watertight against rain.

Consequently it is possible to make the housing of a low cost lightweight plastic material in which the flexibility of the material facilitates the installation as well as the opening up of a previously installed housing to provide access to the parts and connections located within the housing.

Nevertheless, the ready access housings now on the market have certain disadvantages, one being difficulty of installation particularly with respect to low temperature environment; difficulty in opening up the housing for inspection or change of connections; vulnerability with respect to water running along the undersurface of the cable; and high molding cost due to the use of neoprene as the material from which the housing is fabricated or molded.

For instance, the prior art housings are formed with split end walls which are integral with the cover. In other words, the cover is a molded part of a complex shape which cannot be unfolded to provide a more or less coplanar element. Even under the most favorable climatic conditions, the prior art cover can be flexed only to a partially opened position hardly more than sufficient to permit the split end walls to be slipped over the cable. It is practically impossible to open up the cover, for purposes of either initial installation or subsequent access, at subzero temperatures.

It is an object of our invention to provide a housing which requires less installation time than the prior art devices, and which can be more readily opened up for making additional connections, and which is suitable for cold weather use.

According to the present invention, the foregoing difficulties are overcome by providing a housing in which the cover is in the form of a U-shape molded product which is capable of being unfolded to provide a substantially coplanar element. In other words, the shape of the cover is such that it can be caused to assume an open position without subjecting the substance of the cover to any substantial stress other than flexural stress.

Another object is to provide a housing having improved entry means for bringing the cable through the ends of the housing. The entry means of prior art housings is in the form of a split sleeve which permits entry of water running along the undersurface of the cable, whereas the present invention provides a nozzle which completely surrounds the cable, and which is relieved of any housing supporting function.

According to our invention, the housing comprises a base assembly and a cover, the entry means being associated with the base so that the cover can be opened up without disturbing the relationship of the cable to the entry means. This permits the use of an improved type of entry means which completely surrounds the cable and in which the wall portion which contacts the undersurface of the cable is continuous, thus providing means for diverting water which runs along the undersurface of the cable.

A further object is to provide an improved housing which encloses the messenger as well as the cable, thus permitting a simplified construction, reducing installation time, and providing an arrangement which is less subject to attack by corrosive atmosphere.

A still further object is to provide improved entry means in the form of a nozzle, the nozzle being of a special shape so that it provides an opening which conforms generally to the overall shape of the messenger cable, even when trimmed so as to accommodate messenger cables of a wide range of sizes.

Still another object is to provide an improved housing for use in corrosive atmospheres which is characterized by a minimum number of exposed metal parts.

Another object is to provide an improved drop wire loop which is noncorrosive and which is characterized by the ability to assemble it to the housing base on the job, after the drop wires have been connected.

Other objects, features and advantages will become apparent as the description proceeds.

With reference now to the drawings in which like reference numerals designate like parts:

FIG. 1 is an elevation of a preferred embodiment of our invention, partially broken away to show the relationship of the cable housing to the messenger cable;

FIG. 2 is an end view of FIG. 1, with the cable removed;

FIG. 3 is a longitudinal vertical section of the base assembly taken along line 3—3 of FIG. 2; with the cover shown in broken lines;

FIG. 4 is a horizontal section taken along line 4—4 of FIG. 3 and also showing the cover;

FIG. 5 is a vertical section taken along line 5—5 of FIG. 3 showing the operation of the nozzle lock;

FIG. 6 is a longitudinal section of the housing with the ends removed;

FIG. 7 is an end view of FIG. 6;

FIG. 8 is an enlarged vertical section taken along line 8—8 of FIG. 6;

FIG. 9 is an enlarged vertical section taken along line 9—9 of FIG. 7;

FIG. 10 is a longitudinal vertical section of the cover alone;

FIG. 11 is a bottom view of FIG. 10;

FIG. 12 is a plan view of the base strip;

FIG. 13 is a bottom view of the base strip;

FIG. 14 is a vertical section taken along line 14—14 of FIG. 13 showing the side beads;

FIG. 15 is a vertical section taken along line 15—15 of FIG. 12 showing the end bead;

FIG. 16 is a detailed view taken along line 16—16 of FIG. 3 showing the upper end of the drop wire loop;

FIG. 17 is a side elevation showing a modified end piece; and

FIG. 18 is a section of the messenger cable, taken along line 18—18 of FIG. 1.

In FIG. 1 the reference numeral 20 indicates the messenger cable, and the reference numeral 21 indicates the cable housing generally, which surrounds a portion of the messenger cable 20.

The cable housing comprises a base assembly 22 and a cover 23. The base assembly includes entry means in the form of nozzles 24 located at each end and which make a close fit with the messenger cable 20. The base assembly 22 (FIG. 3) comprises a base strip 25 and end pieces 26 of which the nozzles 24 form an integral part. Preferably the end pieces 26 are detachably connected to the base strip 25 by suitable interlocking means, although the parts may be integrally formed if desired. The interlocking means comprise an end bead 27 on the base strip 25 which fits into a correspondingly shaped recess 28 formed in the end piece 26.

The cover 23 is detachably connected to the base assembly 22 by means of grooves 30 and 31 (FIG. 10) which fit respectively over side beads 32 of the base strip 25 and over the marginal portions of the end pieces 26, as shown in FIG. 4. A flange 33 provides the outer wall of the groove 31.

The parts 23, 25 and 26 are formed of a somewhat flexible material, such as polyethylene, which has sufficient resilience so that a snap fit can be obtained between the beads 27, 32, and the recess 28 and groove 30, respectively, and so that full surface contact will be provided between the walls of grooves 31 and the marginal portions of end pieces 26, thus providing reasonably watertight joints. The parts are so arranged that the cover 23 may be partially or completely removed without disturbing the relationship of the base assembly 22 and its nozzles 24 to the messenger cable 20.

The base assembly 22 also includes two reinforcing members 35 and 36 which are disposed above and below the central part of the base strip 25 as shown in FIGS. 8 and 9. These reinforcing members are preferably formed of stainless steel strip, the lower one being of channel shape. The base assembly 22 also includes two clamps 37, one at each end. Each clamp 37 is a two-part device, mounted by means of a rivet 38 (FIG. 9) which extends through the reinforcing elements 35, 36 and the base strip 25. The upper ends of the clamps 37 are connected to each other by a tie brace 42. Thus a fairly rigid rectangular assembly is provided.

The messenger cable 20, as shown in FIGS. 1 and 18, comprises a messenger element 43 and a cable element 44. The cable element in turn comprises a core 45 and a sheath 46. The messenger cable shown is known as an integrated messenger cable, or figure eight cable, the characteristic of which is that the sheath 46 encloses the messenger 43 as well as the core 45, thus providing a continuous web 46a for supporting the core 45. However, the invention is equally applicable for use with lashed cable, in which the cable element is supported from the messenger by a helical lashing wire.

The clamps 37 each include a messenger gripping part 39 which grips the messenger element 43, and jaw portions 40 which engage the cable element 44 either directly, or by a sheath gripping arrangement (not shown). Thus, the housing 21 is supported from the messenger element 43, and the clamps 37 provide a termination for the sheath 46 so that the sheath may be stripped from the core 45 at points lying between the two clamps 37. The tie brace 42 prevents a spreading of the clamps 37 due to tension transmitted by the sheath, when severed.

The stripping of the sheath 46 from the core 45 permits the separation of certain conductor pairs 45a from the core 45 for various splicing operations, or for connection to drop wires 47 through the medium of suitable terminal blocks indicated in broken lines in FIG. 6.

An example of a suitable sheath gripping arrangement is shown in Schreyer application, Serial No. 168,093 filed January 23, 1962, now Patent No. 3,144,500, and forms no part of the present invention. According to our invention, the cable housing 21 is supported from the messenger element 43 by means of the clamps 37 which are located entirely within the housing 21 so as to be protected from corrosive atmospheric conditions, and also so as to provide a greatly simplified construction.

Each end piece 26 is split at the top so that it may be slipped over the messenger cable 20. FIG. 3 shows the split 50 in the marginal portion of the end piece 26, and FIG. 5 shows the beaded edges 51 of the nozzles 24 at the point of splitting. These two edges 51 are locked to each other by means of a nozzle lock 52 which is in the form of a channel shaped strip having upper and lower flanges 53 and 54 which are connected by a web 55. The flanges are curved to follow generally the configuration of the wall of the nozzle 24, and the upper flange 53 is recessed to accommodate the beaded edges 51. Thus the edges 51 are held against spreading, and at the same time the nozzle lock 52 provides a watertight seal. The nozzle lock 52 is an extrusion of a suitable material, such as polyethylene, but preferably is somewhat stiffer than the material of which the parts 23, 25, and 26 are formed. The combination of the nozzle lock 52, plus the beaded edges 51, imparts considerable rigidity to the nozzle, and the rigidity may be enhanced by the stiffness of the material from which the nozzle lock is fabricated.

The nozzle 24 is tapered as shown in FIGS. 1 and 2 so that messenger cables 20 of a considerable range of size can be accommodated. This accommodation is effected by trimming off the outer end of the nozzle at a point such that the dimension of the opening is sufficient to receive the messenger cable in its entirety, the opening being somewhat pear-shaped for this purpose. The joint between the end of the nozzle and the messenger cable may be sealed by sealing tape, not shown.

One feature of our invention is that the nozzle 24 is so arranged that the nozzle lock 52 is disposed substantially parallel to the axis of the messenger cable 20, with the result that the nozzle lock 52 can be applied to the nozzle 24 by a longitudinally sliding movement. The upper portion of the outer flange 33 of the cover 23 is cut away as indicated at 34 in FIG. 2 so that the nozzle lock 52 may be abutted up against the marginal portion of the end piece 26, thus providing a reasonably effective seal against the entry of moisture through the split 50 (FIG. 3).

The base strip 27 is provided with a plurality of closed or knockout slits 56 which may be opened up to accommodate whatever number of drop wires 47 are used. The drop wires are customarily arranged with a slack loop 57, and to this end drop wire loops 58 are provided for the slack loops 57.

The drop wire loops 58 are also molded products formed of a suitable resin, such as polyethylene. The base strip 27 is provided with three sets of holes 59, as shown in FIGS. 12 and 13 which receive the upper ends of the three drop wire loops 58. As shown in FIGS. 3 and 16, the upper end of each leg of the drop wire loop 58 is provided with a tang or head 60, and a slot 61, the arrangement being such as to permit compression of the upper end to facilitate entry of the head 60 into the hole 59, and as to prevent its withdrawal. A shoulder 62 is provided on each leg of the drop wire to limit the extent of insertion.

The foregoing arrangement obviates the necessity of threading the drop wire through the slack loop before making the connection to the terminal block. In other words, according to the present arrangement, after the drop wires have been connected, then the slack wire may be arranged into the slack loops 57, and then the drop wire loops 58 are snapped into place to maintain the slack loops 57.

The base strip 25 is provided with several U-shaped members 63 formed of stainless steel wire which are pivotally mounted in ears 64 on the underside of the base strip 25. These serve as cover locks which swing from a downwardly hanging position up into the upright position shown in FIGS. 1 and 2, and which are maintained in the upright position by notches 65 shown in FIG. 11 formed in the lower edge of the cover 23. This arrangement maintains the grooves 30 of the cover in engagement with the beaded edges 32 of the base strip 25.

In operation, the sheath 44 is stripped from the core 45 at points between the clamps 37. This is accomplished by slitting the web 46a in the case of integrated messenger cable or removing the lashing wire in the case of lashed messenger cable. Then the clamps 37 are arranged and tightened up so that the base strip 25 is supported from the messenger cable 20. The conductor pairs 45a may then be separated from the core 45, the desired connections made to the drop wires 47 either directly or through terminals provided by the terminal blocks 48, and the drop wire loops 58 applied.

Then the end pieces 26 may be snapped over the messenger cable and a determination is made as to the amount of material that must be trimmed off of the small end so that the edge of the remaining nozzle will tightly conform to the messenger and the cable. Then the end piece is removed and the trimming effected, and the end piece reapplied to the cable and connected to the base strip 25 by means of the end beads 27 and the recesses 28.

Then the nozzle lock 52 is slid over the beaded edges 51 and pushed into its home position. After that, the cover 23 is applied and the cover locks 63 rotated into their upright position.

In situations where it is desired to splice a branch cable to the messenger cable 20, a modified end piece 66 is used (FIG. 17) which has, in addition to the split nozzle 67, a closed nozzle 68 providing a circular opening for the branch cable. It will be observed in FIG. 7 that the clamp 37 has an auxiliary clamping portion 69 for engaging the branch cable.

The present invention is also useful for other types of splicing, or for dead ending, or for enclosing loading coils. For use with integrated messenger cable it is particularly useful in corrosive atmosphere areas because the support means 37 are entirely concealed; the only exposed metal parts are the reinforcing strip 36 and the cover locks 63, both made of corrosion resistant stainless steel.

The polyethylene of which the parts are made retains its flexibility at subzero temperatures, and can be injection molded, thus providing a much lower cost of fabrication than the neoprene parts of the prior art.

Although only a preferred embodiment of the present invention has been described herein, it will be understood that various modifications and changes may be made in the construction shown without departing from the scope of the invention as pointed out in the appended claims.

We claim:

1. A ready access cable housing designed for use with messenger cable of the plastic sheath type comprising a base assembly, and a flexible cover, said base assembly including clamping means enclosed within said housing and having one jaw portion for engaging the messenger element of a messenger cable so that said housing may be supported from said messenger and having a second jaw portion engaging the cable element of said messenger cable, and two split end pieces providing entry means for said messenger cable, said flexible cover comprising a molded product of inverted U-shape detachably connected at its edges to said base assembly and being capable of being unfolded to provide a substantially coplanar element, said cover enclosing both the messenger element and the cable element of said messenger cable, said end pieces each providing a continuous edge for engagement with the undersurface of said cable element.

2. A ready access cable housing for messenger cable comprising a base assembly, and a flexible cover detachably secured at its edges to said base assembly, said base assembly including two end pieces providing entry means for said messenger cable, and clamping means enclosed within said housing for engaging the messenger element of said messenger cable in housing supporting relationship, said entry means comprising an outwardly extending substantially conical portion for surrounding both the messenger element and the cable element of said messenger cable, said end pieces each being split at the upper portion thereof, and means connecting the adjacent edges of said split end pieces along said outwardly projecting portion to provide a nozzle which completely surrounds said messenger cable.

3. A ready access cable housing as claimed in claim 2 in which said end pieces are detachably connected to the remainder of said base assembly.

4. A ready access cable housing as claimed in claim 2 in which said connecting means comprises a slidably mounted locking strip arranged parallel to the longitudinal axis of said housing and adapted to overlie said messenger element in parallel relationship to the longitudinal axis thereof, so as to permit longitudinally sliding movement of said locking strip after the positioning of said end pieces around said messenger cable.

5. A ready access cable housing as claimed in claim 2 in which said connecting means comprises a channel shaped section having upper and lower curved flanges embracing said adjacent edges of said nozzle, said adjacent edges being beaded and one of said flanges being recessed to accommodate said beaded edges.

6. A ready access housing as claimed in claim 2 in which said base assembly comprises a base strip, said base strip, said end pieces, and said flexible cover being formed of polyethylene.

7. A ready access cable housing as claimed in claim 2 in which said base assembly includes a base strip, knockout slits formed in said base strip to accommodate drop wires, and drop wire loops detachably connected to said base strip to permit the arrangement of a slack loop in said drop wires prior to the connection of said drop wire loops to said base strip.

8. A ready access cable housing as claimed in claim 7 in which said drop wire loops each comprise a U-shaped structure formed of a resilient synthetic resin material, a head at the end of each leg of said U-shaped material, said base strip having an opening for receiving said legs, the diameter of said opening normally being less than the diameter of said head, and a slot formed in each of said legs immediately adjacent to said head to permit a flexing and contracting of said head sufficient to permit passage thereof through said opening.

9. A ready access cable housing designed for use with integrated messenger cable in corrosive atmospheres comprising a base assembly, and a flexible cover, said base assembly including a base strip, reinforcing members disposed above and below said base strip and extending for substantially the full length thereof to provide a laminated base structure, a supporting clamp disposed near each end of said laminated base structure, fastening means securing said clamps to said laminated base structure in an upright position, said base strip having knockout slits for receiving drop wires, and drop wire loops detachably connected to said base strip for supporting drop wires when arranged with a slack loop, said base assembly also including split end pieces located beyond each of said clamps and providing entry means for a messenger cable, said flexible cover being detachably connected to said base assembly to provide an enclosed housing, and said supporting clamps being located within said housing, said base strip, said flexible cover, said end pieces, and said drop wire loops being formed of a corrosive resistant plastic material, and the lower one of said reinforcing members being formed of stainless steel.

10. A read access cable housing as claimed in claim 9 in which said entry means are each provided with edge portions adapted to closely surround said messenger cable and to be sealed thereto in order to minimize the circulation of the surrounding atmosphere through the interior of said housing.

11. A ready access cable housing for messenger cable comprising a base assembly, and a flexible cover detachably secured at its edges to said base assembly, said base assembly including two end pieces, and clamping means enclosed within said housing for engaging the messenger element of said messenger cable in housing supporting relationship, said end pieces each including a nozzle, one wall of which is parallel to the axis of said messenger cable, said end piece being slit along said parallel wall portion, and nozzle lock means connecting the edges of said wall portion adjacent to the split to provide a conical shaped nozzle which completely surrounds said messenger cable.

References Cited by the Examiner
UNITED STATES PATENTS 2,891,101 6/59 Koliss _____ 174—5
3,040,121 6/62 Gillemot _____ 174—93

FOREIGN PATENTS 462,409 1/50 Canada

JOHN F. BURNS, *Primary Examiner.*
JOHN P. WILDMAN, *Examiner.*